(No Model.)
E. WELZ & A. RITTNER.
CLARIFYING APPARATUS FOR BREWING.
No. 247,280. Patented Sept. 20, 1881.
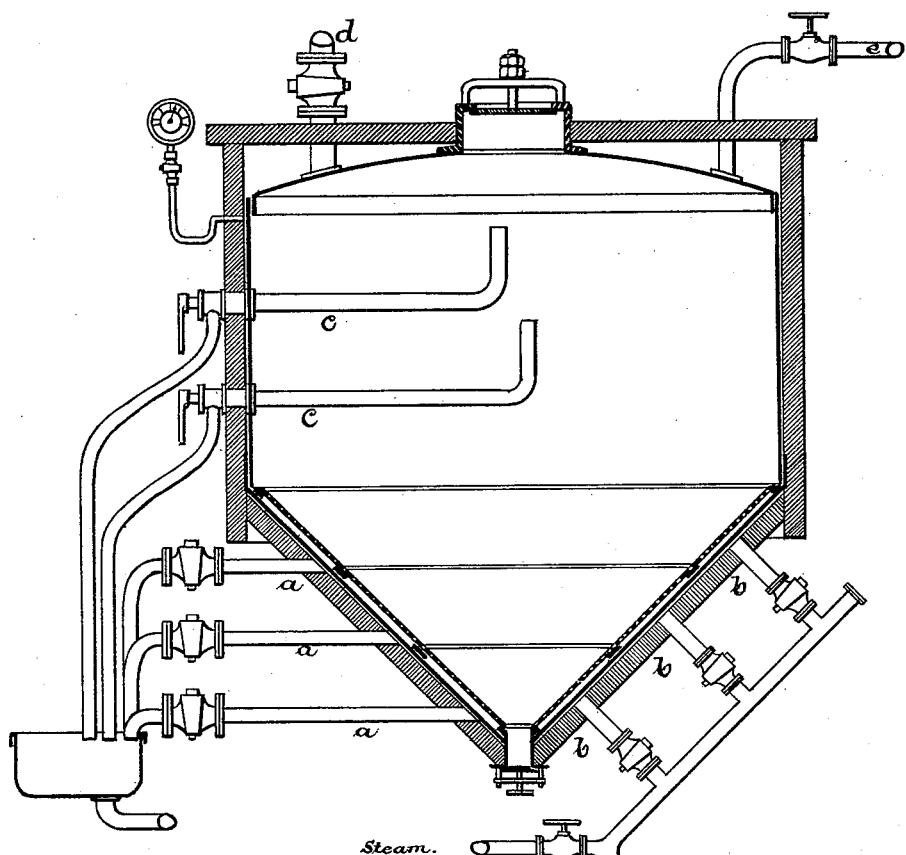

UNITED STATES PATENT OFFICE.

EMIL WELZ, OF BRESLAU, AND AUGUST RITTNER, OF SCHWEIDNITZ, PRUSSIA, GERMANY.

CLARIFYING APPARATUS FOR BREWING.

SPECIFICATION forming part of Letters Patent No. 247,280, dated September 20, 1881.

Application filed May 27, 1880. (No model.)

*To all whom it may concern:*

Be it known that we, EMIL WELZ and AUGUST RITTNER, residing, respectively, at Breslau, Prussia, and at Schweidnitz, Prussia, have invented certain new and useful Improvements in Clarifying Apparatus for Brewing, of which the following is a specification.

Heretofore the clarifying apparatus used for brewing purposes consisted of square or cylindrical vessels, which were open at the top and had a flat double bottom. In such clarifying apparatus as heretofore used the upper bottom was provided with small holes, like a sieve. When the mash to be filtered was let into this said clarifying-vessel the dregs or returns, &c., would settle down onto the said sieve-bottom and form the necessary filtering-layer for the wort standing above it. The clear or filtered wort was drawn off by means of pipes applied between the said double bottom. This process, as heretofore applied with the former clarifying apparatus, has many deficiencies, inasmuch as in consequence of the slowness of its performance the wort very soon becomes cold and acidiferous, while, on the other hand, a thorough extraction of the dregs will never take place. We avoid these deficiencies and obtain most thorough extraction and quick filtration by the apparatus illustrated in the accompanying drawing, in which it is shown by a vertical section.

Our clarifying apparatus consists of a vessel of cylindrical or polygonal form, which is provided with a funnel-shaped or conical double bottom, the upper bottom of which is provided with small holes, like a sieve, this apparatus being closed by a flat or vaulted cover, the joints of which are made perfectly air and steam tight. It is lined with bad conductors of heat in order to prevent cooling, and is provided with a man-hole, safety-valve, and manometer.

$a\ a\ a$ are pipes leading from between the double bottom, and serving for the purpose of conducting the clear wort out of the apparatus.

$b\ b\ b$ are pipes leading into the space between the double bottom, by means of which pipes steam and hot water can be conducted into the apparatus.

$c\ c$ are pipes leading into the cylindrical part of the apparatus, and capable of turning in stuffing-boxes.

$d$ is the pipe by which the mash to be filtered is led into the apparatus, and $e$ is another pipe for introducing air into the apparatus, by means of a forcing-pump, for the purpose of creating a certain pressure in the apparatus.

Our said apparatus is applied as follows, viz: The mash to be filtered is pumped through the pipe $d$ into the apparatus, where it is left to quiet down until the dregs have settled down. This will take about half an hour's time. Then the cocks applied to the pipes $a\ a\ a$ are opened to draw off the clear wort filtered through the dregs which have settled down on the bottom. This process takes by far less time with our new apparatus than it does with the apparatus as heretofore used, as, by means of the funnel-shaped form of the bottom, the filtering-surface is made considerably larger in the new than it can be in the old apparatus. The wort standing above the dregs has become entirely clear in consequence of the settling down of the latter, since, by reason of the apparatus being closed on all sides, and especially at the top, any material cooling of the fluid will not take place, and thus every agitation of the latter created by such cooling will be prevented. The clear wort above the dregs is drawn off by means of the pipes $c\ c$, successively brought into action. After the clear wort has run out of the apparatus as much as possible, air is pumped in the latter by means of the pipe $e$ and some suitable forcing-pump. In consequence of the pressure obtained in the apparatus thereby, the remainder of wort still adhering between the dregs is pressed out completely, and the dregs themselves are pressed into the driest possible state. After this has been completed compressed steam is blown by means of a suitable steam-boiler through the pipes $b\ b\ b$ into the dregs to loosen them. Then, after closing the valve of the steam-pipe and all other cocks, and opening the valve or cock of another pipe for hot water, the same being also connected to the pipes $b\ b\ b$, hot water is introduced through the latter among the dregs in order to lixiviate the very last particles of wort. The dregs are left quiet again to allow them to settle down, which they will do within the space of about a quarter of an hour, whereupon the fluid containing the lixiviated wort is drawn off by means of the pipes $a\ a\ a$ and $c\ c$, in the same manner as above described.

Having thus described our invention, what we claim as new, and desire to secure by Letters Patent, is—

1. In a clarifying apparatus for brewing, an air and steam tight vessel, provided with a conical or funnel-shaped double bottom continuing the wall of said vessel downward, the upper member of which bottom is perforated like a sieve throughout its entire surface, and the lower member of which bottom is provided with means of discharge, substantially as described.

2. A clarifying apparatus provided with the pipes $a\ a\ a$, communicating at different altitudes with the lower portion of the vessel, and the turning pipes $c\ c$, communicating at different altitudes with the upper portion of the vessel, by means of which pipes the clear wort can be drawn off simultaneously at different altitudes from between the double bottom and above from the surface of the mash, substantially as described.

3. In a clarifying apparatus for brewing, the combination, with an air and steam tight vessel provided with a conical bottom continuing the wall of the vessel downward, which bottom has an inner perforated member forming a chamber, of pipes $b$, communicating with said chamber at different altitudes, which pipes are united by a common pipe, and the latter provided with an elbow and cocks, whereby steam or hot water may be introduced among the dregs or returns, supported by the perforated bottom, and thereby insure complete lixiviation, substantially as described.

In testimony whereof we have signed our names to this specification in the presence of two subscribing witnesses.

EMIL WELZ.
AUGUST RITTNER.

Witnesses:
L. SCHWARZ,
MAX NEUBERT.